US009768971B2

United States Patent
Saxena

(10) Patent No.: US 9,768,971 B2
(45) Date of Patent: Sep. 19, 2017

(54) COMMUNICATION DEVICE AND A METHOD FOR OPERATING A COMMUNICATION DEVICE

(71) Applicant: Intel IP Corporation, Santa Clara, CA (US)

(72) Inventor: Alok Saxena, Bangalore (IN)

(73) Assignee: INTEL IP CORPORATION, Santa Clara, CA (US)

( * ) Notice: Subject to any disclaimer, the term of this patent is extended or adjusted under 35 U.S.C. 154(b) by 125 days.

(21) Appl. No.: 14/855,411

(22) Filed: Sep. 16, 2015

(65) Prior Publication Data
US 2017/0079009 A1    Mar. 16, 2017

(51) Int. Cl.
*H04W 72/04* (2009.01)
*H04L 12/18* (2006.01)
*H04W 4/06* (2009.01)

(52) U.S. Cl.
CPC ........ *H04L 12/1881* (2013.01); *H04L 12/189* (2013.01); *H04W 4/06* (2013.01)

(58) Field of Classification Search
CPC ... H04W 72/005; H04W 72/042; H04W 4/06; H04W 36/0061; H04W 56/00; H04W 68/00; H04L 5/003; H04L 12/1881
See application file for complete search history.

(56) References Cited

U.S. PATENT DOCUMENTS

| | | | | |
|---|---|---|---|---|
| 7,436,764 | B2* | 10/2008 | Lee | H04W 72/005 370/229 |
| 8,135,419 | B2* | 3/2012 | Wang | H04W 68/00 370/310 |
| 8,437,371 | B2 | 5/2013 | Wang et al. | |
| 8,879,489 | B2 | 11/2014 | Lee et al. | |
| 2010/0329170 | A1* | 12/2010 | Wu | H04W 72/005 370/312 |
| 2011/0173691 | A1 | 7/2011 | Baba | |
| 2014/0086173 | A1* | 3/2014 | Sadeghi | H04L 5/005 370/329 |
| 2014/0241229 | A1 | 8/2014 | Bertorelle et al. | |
| 2015/0208379 | A1* | 7/2015 | Lin | H04W 4/06 370/312 |

(Continued)

OTHER PUBLICATIONS

Rohde & Schwarz, "Testing LTE Rel. 9 Features", retrieved from the Internet : <URL: https://www.rohde-schwarz.com/de/file/1MA210_1E_LTE_R9_Measurements.pdf>, Apr. 2013, Munich, Germany.

(Continued)

*Primary Examiner* — Ahmed Elallam
(74) *Attorney, Agent, or Firm* — Viering, Jentschura & Partner mbB

(57) ABSTRACT

A method and device for reducing the interruption in a first download, i.e. ongoing reception, caused by the start of a second download, i.e. incoming transmission, by identifying the next due timing of a control channel frame of the first download, and then triggering a sequence of deactivation of the first download, requesting a frequency path switch, performing the frequency path switch, reconfiguring and reactivating the control channel, wherein the sequence takes place at a specified time before the identified control channel frame, and then reactivating the first download.

20 Claims, 9 Drawing Sheets

(56) References Cited

U.S. PATENT DOCUMENTS

2016/0192327 A1* 6/2016 Yi .................... H04W 72/005
                                                    370/312
2016/0261394 A1* 9/2016 Kazmi ................ H04L 5/0044
2017/0054568 A1* 2/2017 Lee .................... H04L 12/189

OTHER PUBLICATIONS

International Search Report and the written opinion based on Application No. PCT/US2016/046098 (10 Pages) dated Nov. 25, 2016 (Reference Purpose Only).

* cited by examiner

COMMUNICATION DEVICE AND A METHOD FOR OPERATING A COMMUNICATION DEVICE

TECHNICAL FIELD

Various aspects of this disclosure relate generally to a method and a communication device for reducing the interruption of a first download, i.e. an ongoing reception, caused by the start of a second download, i.e. an incoming transmission.

BACKGROUND

In addition to one-to-one communication, or unicast, services such as phone calling and web browsing, modern mobile cell networks can be used for one-to-many services. Generally speaking, there are two types of one-to-many services: broadcast services, which are available to anyone, and multicast services, which are available only to those users who have subscribed for such services.

Broadcast and multicast services require several different techniques from traditional unicast services. In the unicast approach, multiple streams of the same content are delivered individually from the content provider. However, in the broadcast and multicast approaches, a single stream of content is delivered to multiple users. In broadcast and multicast services, the network has to distribute the data using IP multicast, while the encryption techniques have to ensure that all subscribing users can receive the information stream. To implement these techniques, the Universal Mobile Telecommunications System (UMTS) has developed the use of multimedia broadcast/multicast service (MBMS). MBMS is a one-to-many interface specification for existing and upcoming $3^{rd}$ Generation Partnership Project (3GPP) cellular networks which is designed to provide efficient delivery of broadcast and multicast services, both within a cell as well as within the core network.

The long-term evolution (LTE) MBMS was introduced in 3GPP Release 9 and is known as evolved MBMS (eMBMS). The advantage of eMBMS over other traditional broadcast technologies such as Digital Video Broadcasting-Handheld (DVB-H), Digital Multimedia Broadcasting (DMB), and other broadcast services is that a minimal amount of additional network infrastructure is required because eMBMS can be implemented into the existing cellular networks. So, the cost of eMBMS implementation would be minimal as it would be able to use the existing LTE infrastructure.

To transmit eMBMS data streams, LTE uses an air interface technique known as multicast/broadcast over a single frequency network (MBSFN). This technique employs nearby base stations which are synchronized so that they broadcast the same content at the same time and on the same sub-carriers. As a result, the signals from the different base stations arrive within the cyclic prefix of the user element, and the resulting signal will appear to the user element as one transmission, which contributes to the received signal power.

In LTE, these synchronized base stations lie in a region known as an MBSFN area. MBSFN areas can overlap, so that one base station can transmit multiple sets of content from multiple MBSFN areas. In one MBSFN area, the same content is transmitted to multiple users. One cell in a cellular network may belong to more than one MBSFN area (up to 8).

In each MBSFN area, the LTE air interface delivers the eMBMS using a multicast traffic control channel (MTCH) and a multicast control channel (MCCH). Each MBSFN area contains one MCCH and multiple instances of the MTCH. The MTCH carries the broadcast traffic such as the multimedia data, while the MCCH is the control channel which carries the radio resource control (RRC) signaling messages needed for receiving the MTCH. The MCCH carries the MBSFN Area Configuration message, which is the basis for scheduling MBMS services and providing information on Common Subframe Allocation (CSA) and the multicast channel (MCH) scheduling period. In other words, the MTCH provides the data, while the MCCH provides the instructions for receiving the data. Both the MCCH and the MTCH use the MCH as a transport channel and the physical multicast channel (PMCH) as the physical channel.

However, a problem is encountered when an ongoing eMBMS reception is interrupted by an incoming transmission (e.g. phone call) in, for example, a multi subscriber identity module (SIM) device that uses a cost optimized Hybrid dual-reception, dual-SIM dual-standby (DR-DSDS) platform or the like. If the eMBMS reception is occurring in the reception/transmission main (RX/TX MAIN) radio frequency (RF) path, then the eMBMS reception must be switched to the reception auxiliary (RX AUX) RF path in order to allow for the incoming transmission to take place on the RX/TX MAIN RF path. However, switching the eMBMS reception from the RX/TX MAIN path to the RX AUX path can contribute to an interruption in eMBMS reception that can last up to about 2.5 seconds, which may be of great inconvenience to the end user.

Thus, there remains a considerable need to mitigate the interruption caused by an incoming transmission while there is an ongoing reception in a communication device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the disclosure are described with reference to the following drawings, in which:

FIG. 7B is a continuation of the MSC of FIG. 7A. The MSC could not be accommodated on a single sheet while showing all the necessary details.

DESCRIPTION

Figure 1:
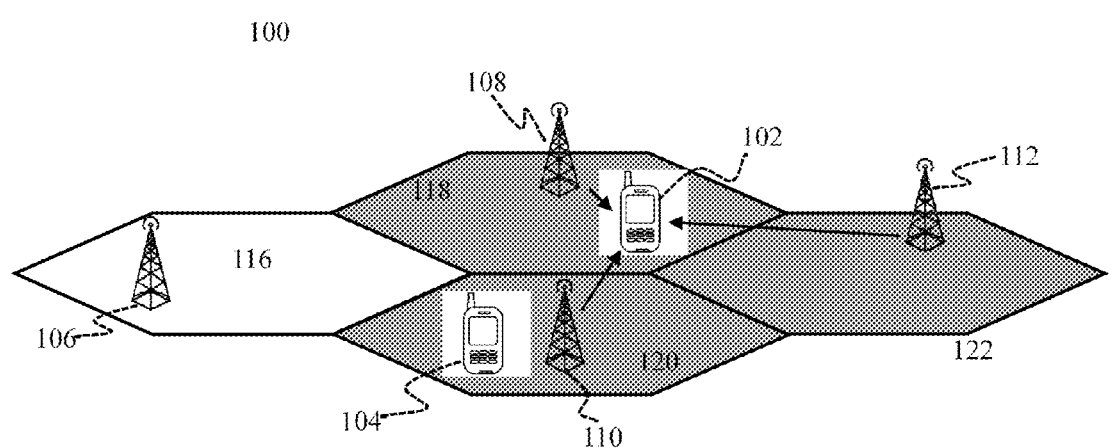
FIG. 1 shows multicast/broadcast over a single frequency network.

The following detailed description refers to the accompanying drawings that show, by way of illustration, specific details and aspects of the disclosure which may be practiced.

As utilized herein, the term "ongoing reception" is used in reference to a first download and the term "incoming transmission" is used in reference to a second download.

The term "mobile terminal" may refer to any kind of communication device.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc.

It is appreciated that the ensuing description may detail exemplary scenarios involving mobile terminal operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

As utilized herein, the term "idle mode" used in reference to a mobile terminal refers to a radio control state in which the mobile terminal is not allocated at least one dedicated communication channel of a mobile communication network. The term "connected mode" used in reference to a mobile terminal refers to a radio control state in which the mobile terminal is allocated at least one dedicated communication channel of a mobile communication network.

The 3$^{rd}$ Generation Partnership Project (3GPP) has introduced a Multicast Broadcast Single Frequency Network (MBSFN) architecture in Long Term Evolution (LTE) Release 9 to support evolved Multimedia Broadcast Multicast Services (eMBMS). In an MBSFN supporting eMBMS, multiple base stations may transmit multimedia data to any proximate users, i.e. mobile terminals, using the same set of frequency resources (i.e. the same set of frequency subcarriers). Such an MBSFN may thus be utilized to provide multimedia data, including e.g. streaming video, audio, text, "push" data, operating system/application updates, etc., to any users within the coverage area.

FIG. 1 shows a multicast/broadcast over a single frequency network 100. This network may include at least mobile terminals, i.e. communication devices, 102 and 104; base stations 106, 108, 110, and 112; coverage regions 116, 118, 120, and 122 respectively corresponding to base stations, respectively. It is appreciated that network 100 is exemplary in nature and may thus be simplified for purposes of explanation.

Base stations 106, 108, 110, and 112 may each be associated with a radio access section of mobile communication 100, i.e. the Radio Access Network (RAN) of mobile communication network 100. Base stations 106, 108, 110, and 112 may thus act as an interface between the RAN of mobile communication network 100 and an underlying core network of mobile communication network 100, and may allow any proximate mobile terminals, such as e.g. mobile terminals 102 and/or 104, to exchange data with the core network of mobile communication network 100 and any further networks connected thereto.

Each of base stations 106, 108, 110, and 112 may respectively provide mobile communication coverage to coverage regions 116, 118, 120, and 122, which may correspond to a single cell (i.e. sector) of a respective one of base stations 106, 108, 110, and 112 or may be composed of multiple cells (i.e. sectors) of a respective one of base station 106, 108, 110, and 112. As shown in FIG. 1, mobile terminals 102 and 104 may be physically located within coverage regions 118 and 120 of base stations 108 and 110, respectively. It is appreciated that although coverage regions 116, 118, 120, and 122 are depicted as having distinct boundaries, it is understood that one or more of coverage regions 116, 118, 120, and 122 may overlap, and accordingly there may exist geographical regions served by two or more of base stations 106, 108, 110, and 112.

As specified by 3GPP, cells supporting MBSFN transmission of eMBMS data may be assigned to one or more MBSFN Areas, i.e. groups of cells providing synchronized transmission of a specific eMBMS stream using a common set of frequency resources, i.e. the same set of one or more subcarriers. Each cell may be assigned to one or more MBSFN Areas, and thus may be configured to provide one or more eMBMS streams to any proximate users. MBSFN Areas may include active cells and reserved cells, where active cells provide the eMBMS stream of the MBSFN Area and reserved cells do not provide the eMBMS stream (and e.g. may not support any eMBMS transmission). Furthermore, each cell may be configured according to either dedicated mode or MBSFN/unicast mode, where dedicated cells may utilize all available system bandwidth (i.e. all subcarriers) for MBSFN communications and MBSFN/unicast cells may perform both traditional unicast and MBSFN communications, such as e.g. utilizing a time division duplex scheme between unicast and MBSFN in which only certain sub-frames contain MBSFN data.

Base stations 106, 108, 110, and 112 may be configured to provide multimedia data, e.g. eMBMS data, to any proximate mobile terminals within respective coverage regions 116, 118, 120, and 122, such as e.g. mobile terminals 102 and 104. Specifically, base stations 106, 108, 110, and 112 may each be assigned to one or more MBSFN Areas. As depicted by the white and gray shading in FIG. 1, in the exemplary scenario of FIG. 1, base stations 108, 110, and 112 may be assigned to MBSFN Area 0 (shaded in gray). Base station 106 may be assigned to MBSFN Area 1 (no shading).

Accordingly, base stations 108, 110, and 112 may transmit a first eMBMS stream of MBSFN Area 0. As previously indicated, it is appreciated that base stations 106, 108, 110, and 112 may be composed of multiple cells, i.e. sectors, where each cell may be individually assigned to an MBSFN Area and/or to active/reserved status. For purposes of explanation, each of base stations 106, 108, 110, and 112 may be assumed to have cells that are collectively assigned to a single MBSFN Area and/or active reserved status (in accordance with the shading of coverage regions 106, 108, 110, and 112 in FIG. 1), although such may not necessarily be the case in other exemplary scenarios. Furthermore, MBSFN Area assignment may be assumed static, i.e. the MBSFN Area assignment of a cell may not change dynamically over time.

As depicted in FIG. 1, mobile terminals 102 and 104 may be located in respective coverage regions 118 and 120 of base stations 108 and 110, which as previously specified may be assigned to MBSFN Area 0. Accordingly, base stations 108, 110, and 112 may provide a first eMBMS stream, which may be received by mobile terminal 102, who has subscribed or is an interested party in the eMBMS stream. Mobile terminal 104 has not subscribed (or is not an interested party) to the eMBMS stream, so it will not receive the data.

As previously indicated, there may exist geographic overlap between coverage regions 116, 118, 120, and 122. For example, coverage regions 118 and 120 may substantially overlap, and accordingly mobile terminals 102 and 104 may receive wireless transmissions from both of base stations 108 and 110. Accordingly, mobile terminal 102 may receive multiple instances of transmissions of the first eMBMS stream, i.e. one instance from base station 108 and another instance from base station 110 (in addition to any further multipaths). Accordingly, as base stations 108, 110, and 112 are synchronized for transmission of the first eMBMS stream and utilize the same wireless resources, mobile terminal 102 may utilize the multiple received instances of the first eMBMS stream, and may consequently utilize signal combination to improve receiver performance. The synchronous nature of cells of the same MBSFN Area may thus improve system performance.

Figure 2:
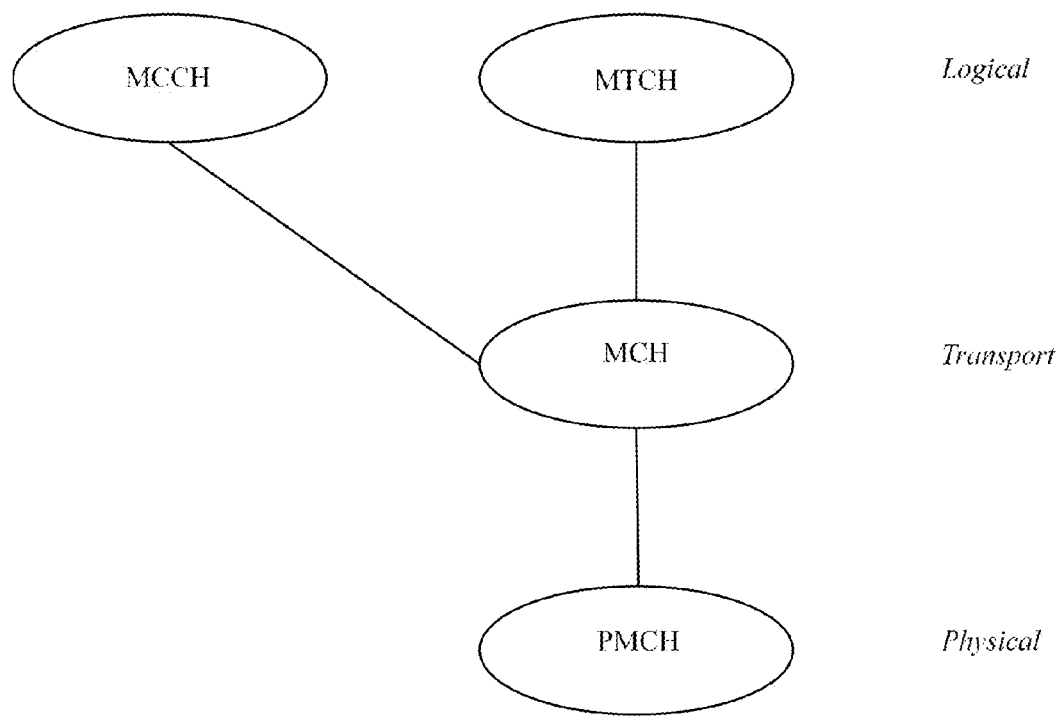
FIG. 2 shows the channel mapping for the logical, transport, and physical channels.

The first eMBMS stream may be composed of both control data and user data, which may each be respectively mapped to the Multicast Control Channel (MCCH) and Multicast Traffic Channel (MTCH) logical channels, respectively. The channel mapping for the logical, transport, and physical channels is depicted in FIG. 2. As shown in FIG. 2, the MCCH and MTCH logical channels are mapped to the Multicast Channel (MCH) transport channel, which is then mapped to the Physical Multicast Channel (PMCH) physical channel.

Accordingly, the PMCH may carry both control data (MCCH) and user data (MTCH). PMCH data may only be transmitted during certain MBSFN subframes, which may be configured by higher layers and synchronized between cells of the same MBSFN Area. In order to receive a given eMBMS stream, a mobile terminal may need to receive both MCCH and MTCH data.

Transmission of MCCH and MTCH data may occur according to a predetermined schedule. As previously indicated, PMCH data may only be transmitted during certain MBSFN subframes, which may be time-division duplexed with traditional unicast subframes. Furthermore, only certain radio frames may contain MBSFN subframes.

As specified by 3GPP for an LTE network configuration, each radio frame (e.g. in a Frequency Division Duplexing (FDD) scheme for uplink-downlink) may be composed of 10 subframes of 1 millisecond each, where each subframe is divided into two slots of 0.5 milliseconds each. Each radio frame may be assigned a System Frame Number (SFN) (which may repeat according to a period configured by higher layers). Similarly, each subframe may be assigned a subframe index from 0-9.

Figure 3:
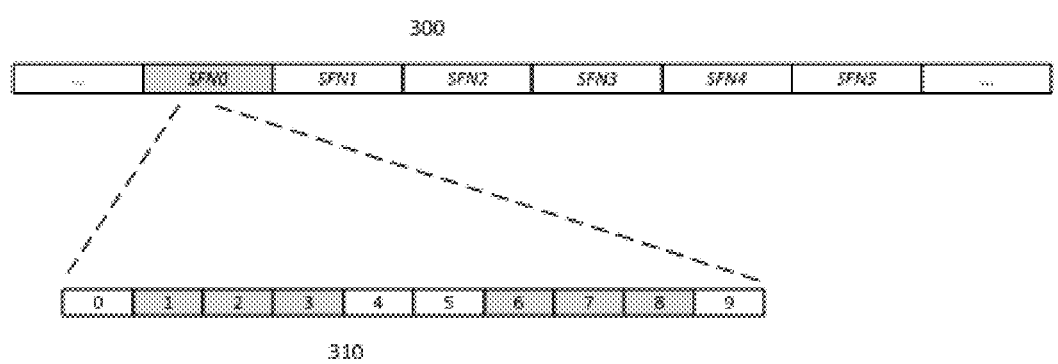
FIG. 3 shows an exemplary illustration of a radio frame sequence.

FIG. 3 shows an exemplary illustration of radio frame sequence 300 and subframe sequence 310.

As shown in FIG. 3, radio frame sequence 300 may include at least radio frames SFN0-SFN5, corresponding to System Frame Numbers 0-5. Each of radio frames SFN0-SFN5 may be divided into 10 subframes of 1 millisecond duration, as shown for SFN0 in subframe sequence 310.

SFN0 may be configured as a radio frame containing MBSFN subframes, as indicated by the gray shading of SFN0. As specified by 3GPP, up to 6 total subframes in a given MBSFN radio frame such as SFN0 may be MBSFN subframes, as indicated by the gray shading of subframes 1-3 and 6-8 of subframe sequence 310. As specified by 3GPP, subframe indices 1-3 and 6-8 (out of a possible index set of 0-9) may be MBSFN subframes.

The scheduling of MBSFN radio frames and MBSFN subframes may be specified by the mobile communication network in the form of System Information Block (SIB) messages. As specified by 3GPP, SIB2 messages may designate the MBSFN radio frames for all MBSFN Areas, and may designate which subframes of the specified MBSFN radio frames are MBSFN subframes available to all MBSFN Areas. SIB13 messages may designate the specific MBSFN subframes for each individual MBSFN Area.

Accordingly, mobile terminal 102 may first read SIB2 and SIB13 messages in order to begin receiving the first eMBMS stream, such as by receiving the SIB2 and SIB13 messages from e.g. base stations 108, 110, and 112. Upon receiving and decoding the SIB2 and SIB13 messages, mobile terminal 102 may determine the scheduling information for the MCCH and MTCH of the first eMBMS stream, which mobile terminal 102 may subsequently utilize to receive the first eMBMS stream.

Mobile terminal 102 may read an SIB2 message (i.e. by a baseband modem component of mobile terminal 102, as will be later detailed), e.g. received from base station 108, which may identify which radio frames contain MBSFN subframes, e.g. by specifying a period, offset, and distribution (i.e. the number of consecutive radio frames contain MBSFN subframes). The SIB2 may further specify which subframes within the identified radio frames are MBSFN subframes. The radio frames and MBSFN subframes may apply to all MBSFN Areas, and thus may indicate the total set of timing resources available for all MBSFN Areas.

Mobile terminal 102 may also read an SIB13 message (i.e. by a baseband modem component of mobile terminal 102, as will be later detailed). The SIB13 message may further specify information regarding each MBSFN Area, including, for example, MBSFN Area 0.

Specifically, the SIB13 message may indicate the scheduling information of MCCH data for each MBSFN Area, which mobile terminal 102 may then utilize to receive MCCH data.

The MCCH may include an MBSFN Area Configuration Message, which may be essential for receiving MTCH data. Accordingly, by reading the MCCH, mobile terminal 102 may identify how to receive the MTCH data containing the user data traffic for the first eMBMS stream.

The MBSFN Area Configuration Message may provide important scheduling information, including Common Subframe Allocation (CSA) and MCH Scheduling Period (MSP) for a given MBSFN Area, i.e. the MBSFN Area corresponding to the MCCH. Mobile terminal 102 may read the MCCH to obtain the CSA and MSP from the MBSFN Area Configuration Message. The MSP may indicate the location of MCH Scheduling Information (MSI) (e.g. typically at the beginning of the MSP), which mobile terminal 102 may utilize in order to identify the scheduling of the MTCH data. Mobile terminal 102 may then receive the MTCH data using the MSI and provide the multimedia data to a user, thereby facilitating reception of the first eMBMS stream.

Accordingly, MCCH reception may be significantly important to receive an eMBMS stream. Failure to receive MCCH data, or receiving incorrect or expired MCCH data, may prevent MTCH reception, thereby prohibiting reception of an eMBMS stream.

In order to allow for less restricted reception scheduling requirements, 3GPP has specified that MCCH data may be transmitted repetitively, i.e. the same MCCH data (i.e. MCCH containing the same MBSFN Area Configuration Message) may be transmitted multiple times. Accordingly, mobile terminal 102 may not be restricted by the need to receive MCCH data during only a single allocated time period, and may instead choose to receive a convenient MCCH transmission instance from the overall set of MCCH repetition instances. Accordingly, a mobile terminal may be free to perform other operations, such as unicast communications or measurements in a relatively uninterrupted manner while occasionally selecting an opportune time to receive MCCH.

Accordingly, 3GPP has introduced MCCH Repetition Periods and MCCH Modification Periods, which are indicated for each MBSFN Area in SIB13. MCCH messages may be transmitted according to the MCCH repetition period, where each MCCH message occurring in a given MCCH modification period is identical, i.e. contains the same MBSFN Area Configuration Message. A mobile terminal may thus need to only receive a single MCCH message during a given MCCH modification period in order to ensure current MCCH information is obtained.

Figure 4A:
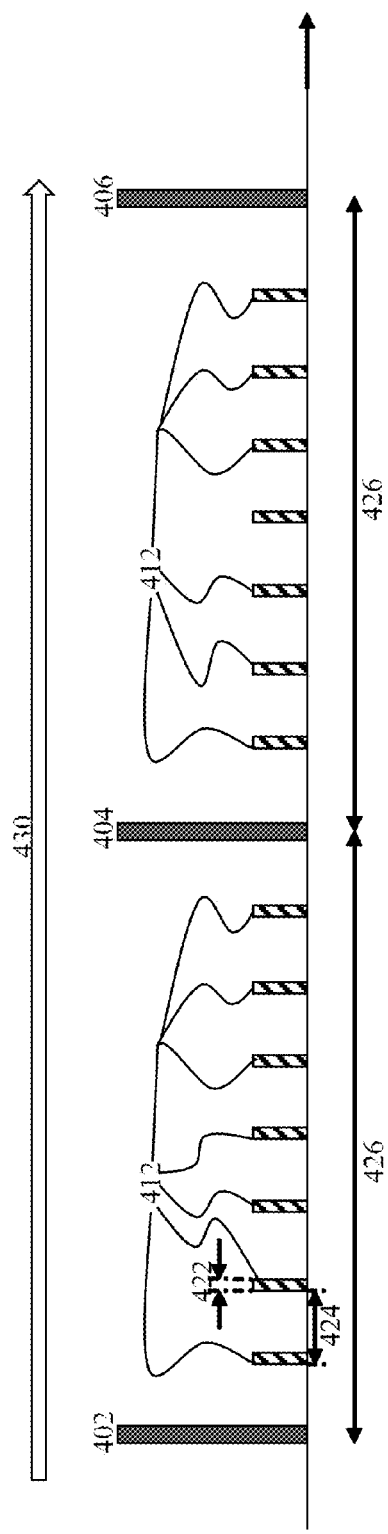
FIG. 4A shows an exemplary timing diagram of a scenario before a request for an RF path switch.

FIG. 4A shows a timing diagram depicting a scenario before the request for an RF path switch. For purposes of this explanation, the following description may focus on explaining an aspect of the disclosure as it relates to mitigating the eMBMS interruption for the end user caused by an incoming 2G Circuit Switched (CS) call to a Multi-SIM phone that uses a Hybrid-DR-DSDS platform.

In FIG. 4A, the LTE Inter Radio Access Technology (IRAT) Master is in an idle state with eMBMS reception 430 on the MAIN path. MCCH frames 402, 404, and 406 are separated by MCCH Repetition Periods 426 which may range anywhere from 320 milliseconds (ms) to 2560 ms. IRAT measurements 412 lasting 6 ms in length occur in 40 to 80 ms gap intervals 424. The IRAT measurements are essential to IRAT handover and cell change which allows 3G voice and data services WCDMA RAN to GSM transition to maintain the connection with the mobile terminal between coverage areas to prevent dropped calls.

Figure 4B:
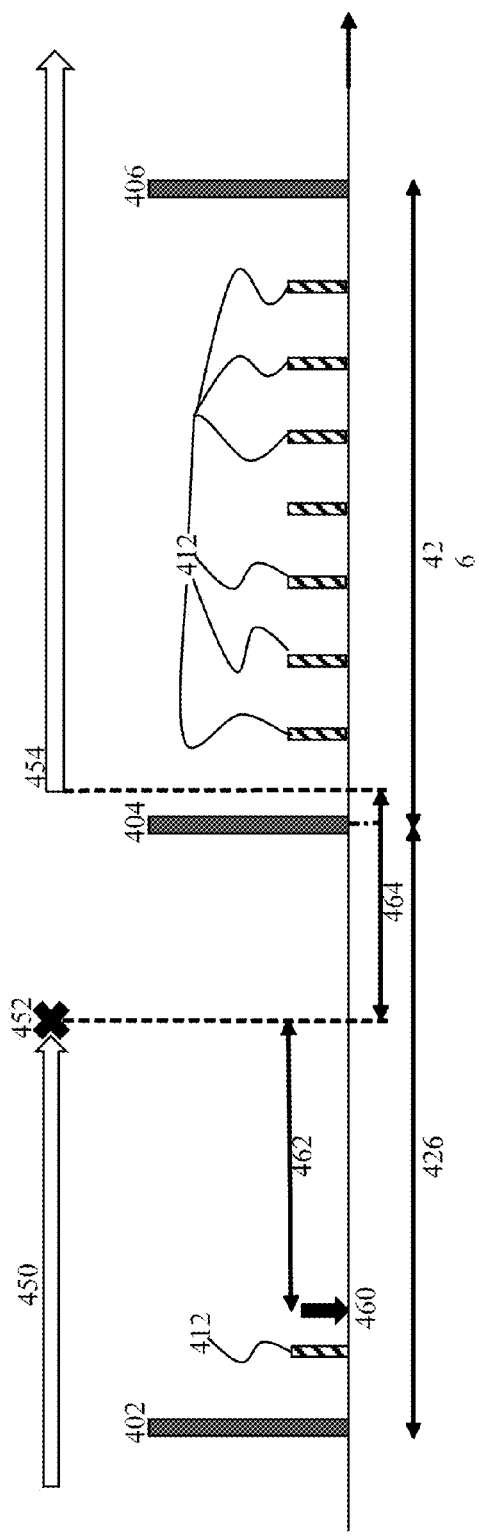
FIG. 4B shows an exemplary timing diagram of a scenario in which an RF request path switch is made in an aspect of the disclosure.

FIG. 4B shows an aspect of the disclosure in which the interruption of an eMBMS data stream due to an incoming transmission, e.g. a 2G phone call, is mitigated. The eMBMS reception 450 is ongoing and the MCCH 402 and IRAT measurements 412 are being conducted as in FIG. 4A when the incoming transmission, e.g. a 2G phone call, is received at 460. However, the eMBMS reception 450 is not terminated immediately. Instead, the eMBMS reception 450 resumes for the span indicated by 462 until 452.

Directly after the incoming transmission is received at 460, during the span indicated by 462, the LTE layer 1 (L1E), which is the physical layer which controls the LTE firmware (FW), receives the RF path switch request from the 2G layer 1 (2G L1) and aborts all activities on the LTE L1, including all IRAT measurements. As can be seen in FIG. 4B, the IRAT measurements 412 cease after 460. The L1E, in conjunction with the evolved Radio Resource Control (eRRC), then identifies the next due timing of the MCCH subframe/radio frame (SF/RF) 404.

Once the occurrence of the next MCCH SF/RF 404 is identified, the L1E waits for the period indicated by 462 until deactivating the eMBMS reception, i.e. deactivating the MTCH and MCCH, at 452. By doing so, the interruption of eMBMS data flow is minimized. After the deactivation of the eMBMS reception 452, the RF path switching is initiated such that there is enough time for all the procedures (the RF path switch, reconfiguration of the MCCH, and reactivation of the MCCH) to finish before the next MCCH SF/RF 404. In other words, the MTCH and MCCH deactivation, the RF path switch, and the reconfiguration and reactivation of the MCCH are all performed in the span depicted by 464 before MCCH frame 404 occurs. Once the MCCH frame 404 is received, the MTCH is reconfigured and reactivated in the span shown by 464 after MCCH frame 404, and reception of eMBMS data continues at 454.

By allowing the eMBMS reception to continue until 452 even after the RF path switch is requested as a result of the incoming transmission at 460, the claimed invention is able to minimize the interruption of the eMBMS reception. Instead of potentially having an interruption in data of anywhere from 320 ms to over 2500 ms, or 2.5 seconds, which corresponds to the MCCH repetition period, the claimed invention reduces this interruption to at most 30 ms, which will barely be perceivable to the user. This at most 30 ms period of time, depicted as 464 in FIG. 4B, is more than sufficient in order to handle the RF path switchover, in which most cases is about 1-2 ms (at worst <10 ms) and the MCCH and MTCH reconfiguration, which may take around 1-2 ms, and their subsequent reactivation.

Figure 5:
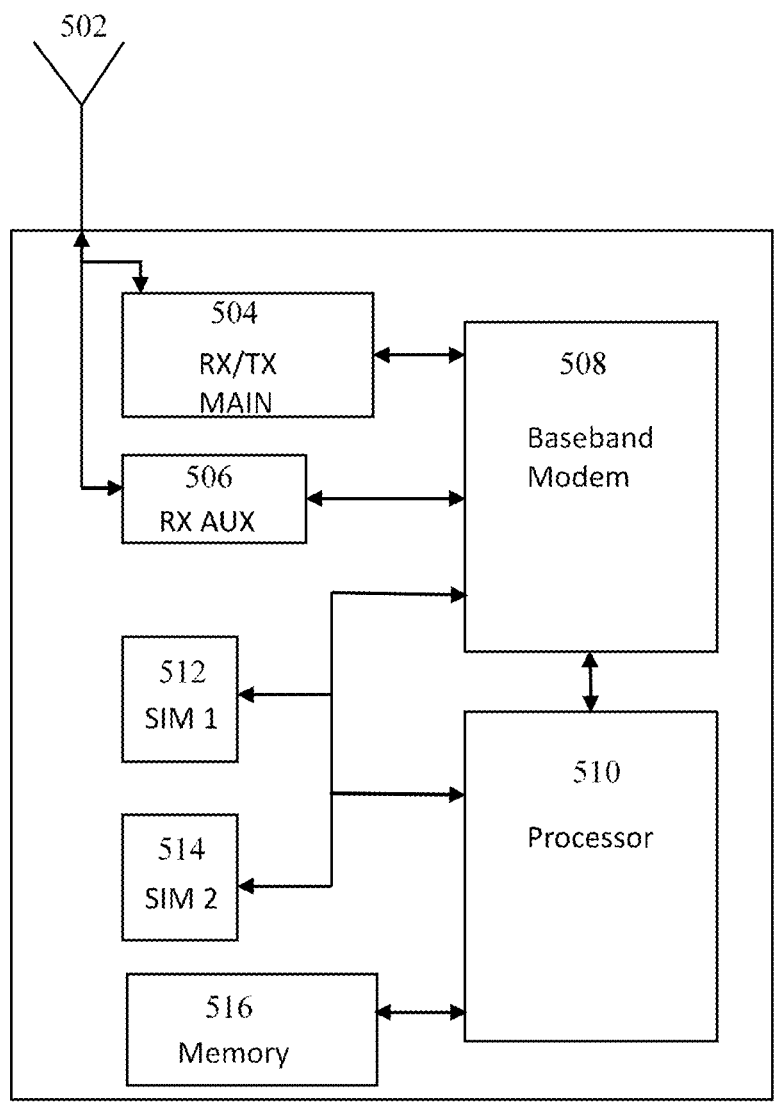
FIG. 5 shows an example of a mobile terminal which employs a Hybrid DR-DSDS platform.

FIG. 5 shows a schematic diagram of a mobile terminal 500 according to one embodiment.

The mobile terminal 500 may correspond, for example, to mobile terminals 102 and/or 104 of FIG. 1.

In this aspect of the disclosure, mobile terminal 500 employs a Hybrid-DR-DSDS platform. The Hybrid-DR-DSDS concept employs an optimized RF engine which consists of an RX/TX MAIN RF path 504 and an RX AUX path 506, which are both coupled to the antennae 502. The RX/TX MAIN RF path 504 may be used for only receiving signals (e.g. watching mobile television) or may also be used for receiving and sending signals (e.g. making a phone call). The RX AUX path 506, on the other hand, may only be used for receiving signals.

Once a signal hits the antennae 502, the antennae is connected to the appropriate RX path (504 and/or 506). Then, the signal is directed to the baseband modem 508, which manages all the radio functions of the mobile terminal 500. The baseband modem 508 is responsible for modulation, demodulation, digital signal processing, and the protocol stack (PS) and typically uses its own firmware (FW). The baseband modem is further coupled to the processor 510, or the processing circuit. SIM 1, 512, and SIM 2, 514, may be coupled to both the baseband modem 508 and the processor 510. A memory 516 of the mobile terminal may be coupled to the processor. The memory 516 may be used to store program code or program instructions, e.g. computer readable medium, which may be executed by the processor 510.

Figure 6:
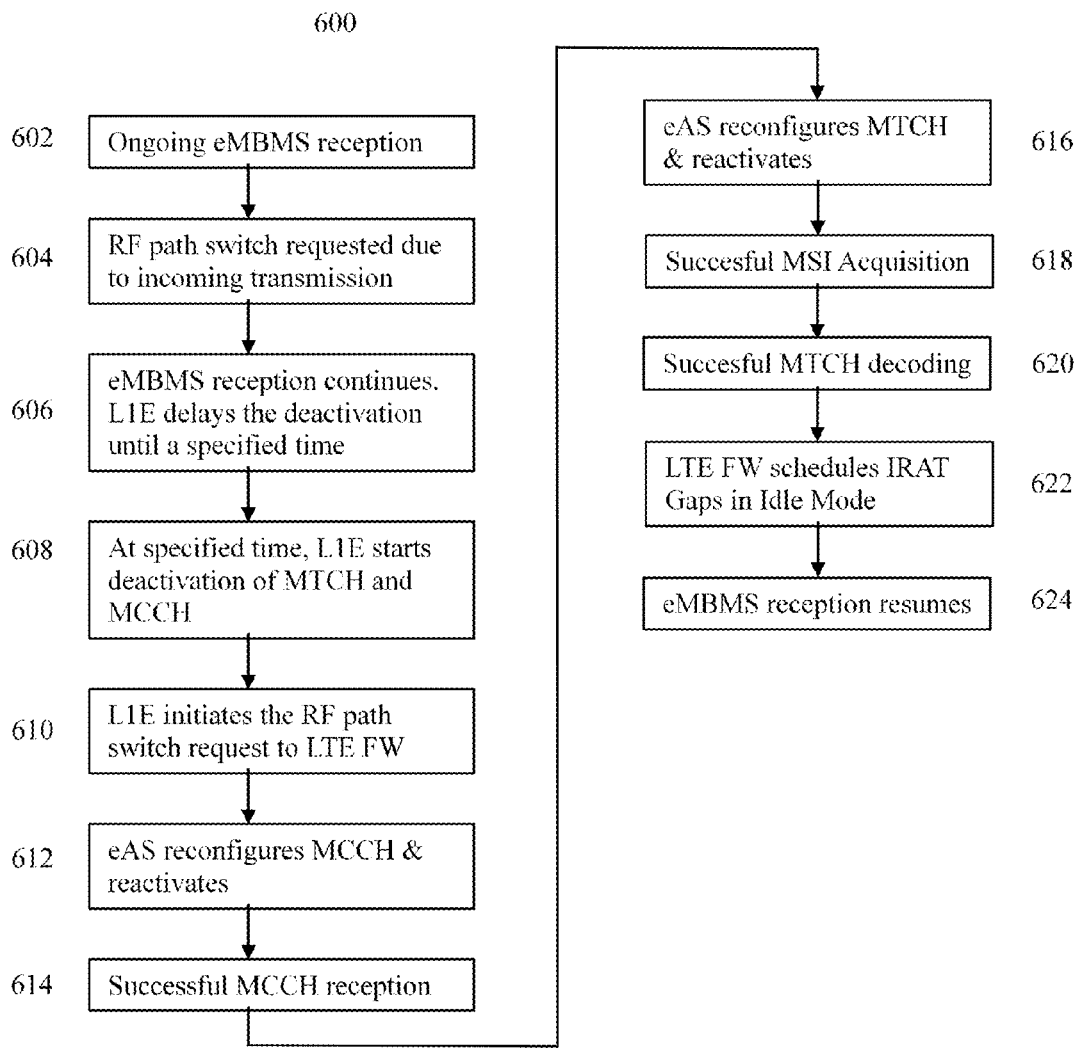
FIG. 6 shows a high-level block diagram for an aspect of the disclosure.

FIG. 6 shows a high-level block diagram 600 which captures the summary of the flow with the 3GPP specified MCCH configuration. In 602, there is ongoing eMBMS reception in the mobile element, which may be in connected mode or in idle mode. In 604, there is an incoming transmission to the mobile element, which triggers an RF path switch request. Here, the IRAT Gaps schedule for 2G/3G are aborted. In 606, the eMBMS reception continues, as the deactivation of the MCCH and the MTCH is delayed until the specified time discussed in FIG. 4B (approximately 30 milliseconds before the next scheduled MCCH subframe/ radioframe). In 608, the specified time is reached, and the MTCH and the MCCH are deactivated. Once the deactivation is complete, the RF path switch request is initiated in 610. After this, in 612, the MCCH is reconfigured and reactivated in time to successfully receive MCCH in 614. Once the MCCH is successfully received, the MTCH is reconfigured and reactivated in 616. Thereafter, the MSI is acquired in 618 and the MTCH can be successfully decoded in 620. If in idle mode, the LTE firmware schedules the IRAT Gaps in 622. In 624, eMBMS reception resumes with minimal interruption so as not to inconvenience the end user.

Figure 7A:
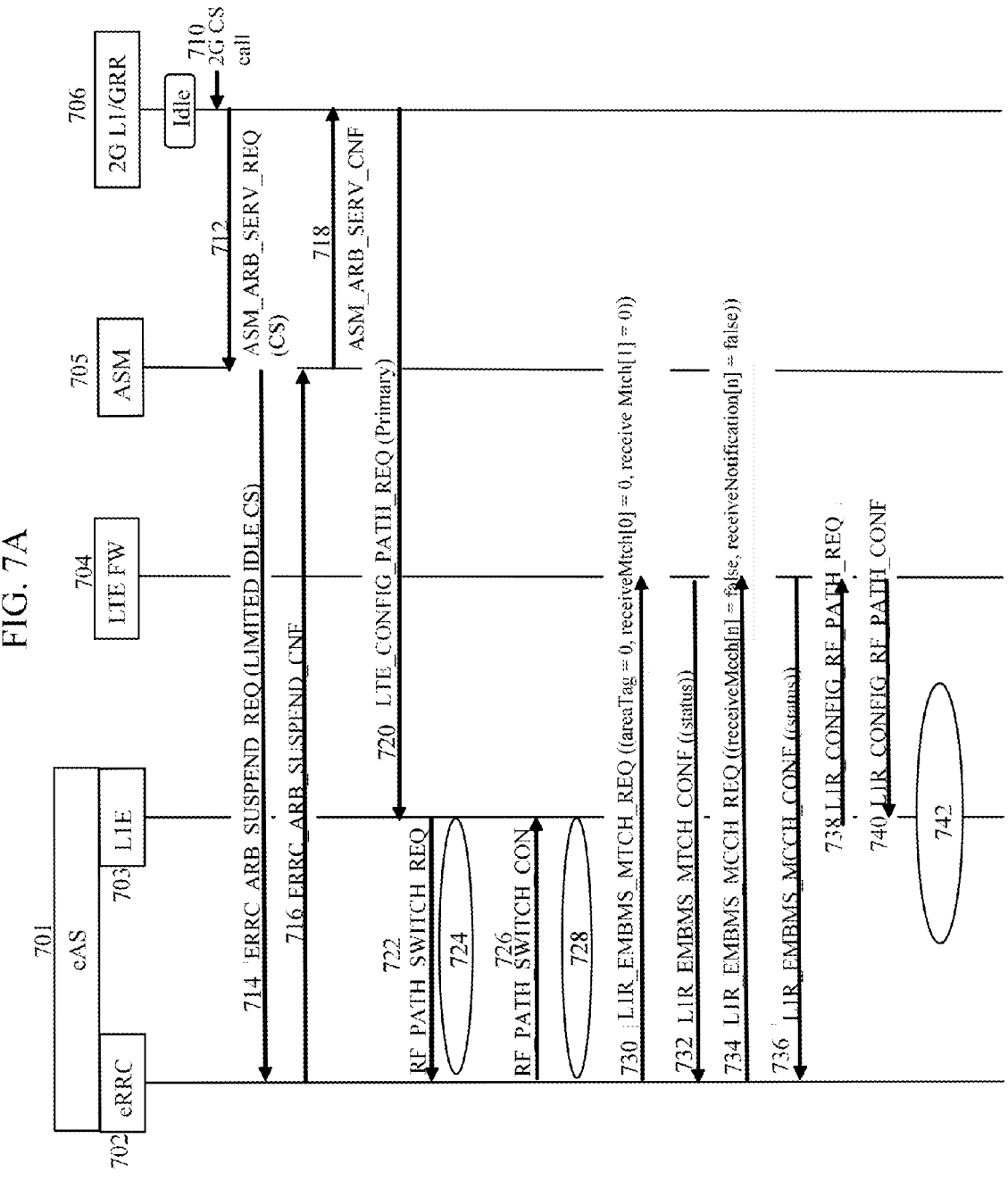
FIG. 7A shows the first section of a message sequence chart (MSC) of an aspect of the disclosure.

FIG. 7A shows the first section of an exemplary message sequence chart (MSC) of an aspect of the disclosure. While FIG. 7A is exemplary of a mobile terminal in idle mode, the same concept may be applied to a mobile terminal in connected mode.

The evolved Access Stratum manager (eAS) 701 manages the various processes in the LTE component of the device, including the evolved Radio Resource Control (eRRC) 702 and L1E 703. The eRRC 702 starts up all the suspend procedures. The LTE firmware (FW) 704 is controlled by the L1E 703. The access stratum manager (ASM) 705, also known as the arbitration server, keeps the intelligence of managing the various call processing, signaling radio bearer (SRB), etc. The 2G L1/GRR 706 consists of the 2G layer 1 (2G L1) component and the layer 2 component, or the GRR.

The 2G L1/GRR 706 is in idle when a 2G CS call 710 comes in. This triggers the messages 712-722, which are the ASM arbitration server request 712 from the 2G L1/GRR 706 to the ASM 705, the eRRC arbitration suspend request 714 from the ASM 705 to the eRRC 702, the resulting eRRC arbitration suspend confirmation 716 back to the ASM 705, which forwards the confirmation in an ASM arbitration server confirmation 718 to the 2G L1/GRR 706. Then, the LTE configuration path request 720 is sent to the L1E 703, which in turn sends the RF path switch request 722 to the eRRC 702.

At this point, the eRRC aborts ongoing public land mobile network searching, cell selection reading, and initiates L1E for IRAT Gap Abortion at 724.

Then, the RF path switch confirmation 726 is sent to the L1E 703. On receiving the RF path switch confirmation 726, the L1E, in 728, will send GAP ABORT IND to 2G/3G, and in conjunction with the eRRC, identify the next due timing of the MCCH RF/SF and cause the deactivation of eMBMS reception and RF Patch Switching to start such that there is enough time for all procedures (deactivation, RF path switch, reconfiguration, reactivation) to finish while the LTE FW does not have to wait for MCCH RF/SF. Therefore, by performing the sequence as outlined in 728, the interruption in eMBMS service is minimalized.

Thereafter, messages 730-740 are sent before the protocol stack (PS) reconfigures the LTE FW with MCCH and MTCH configurations in 742. Messages 730-736 transmit information relating to the eMBMS MTCH and MCCH requests and confirmation messages, while messages 738 and 740 transmit information regarding the RF path switch request and confirmation, respectively.

Figure 7B:
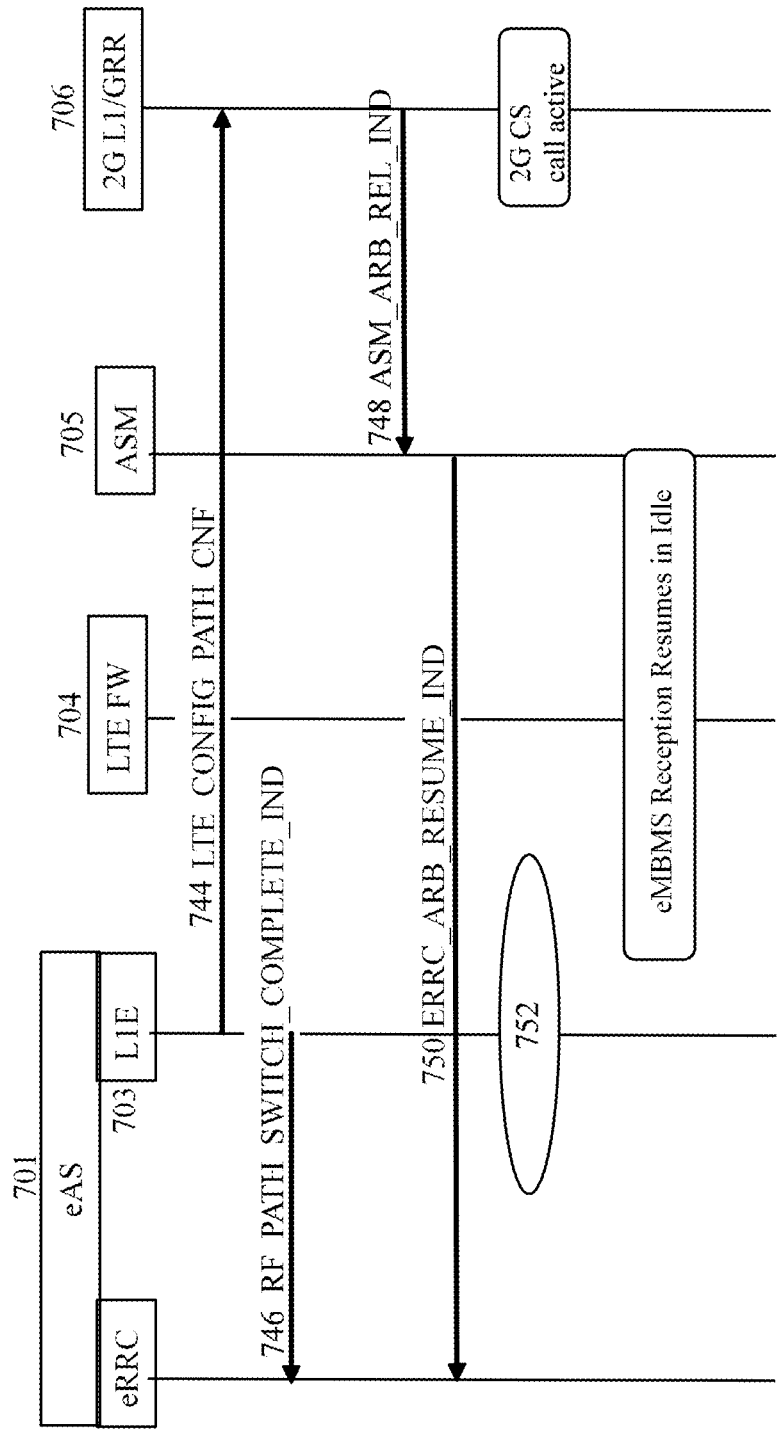
FIG. 7B shows the second section of the MSC of an aspect of the disclosure.

FIG. 7B shows the second section of the MSC of an aspect of the disclosure. FIG. 7B is a continuation of the MSC of FIG. 7A. The MSC could not be accommodated into a single figure while showing all the necessary details.

After the PS reconfigures the LTE FW with MCCH and MTCH configurations in 742 (as shown in FIG. 7A), the LTE configuration path confirmation 744 is sent to the 2G L1/GRR 706 and the RF path switch complete 746 is sent to the eRRC. Thereafter, the ASM_ARB_REL_IND 748 is sent to the ASM 705 while relays the ERRC_ARB_RE- SUME_IND 750 to the eRRC 702.

Once 750 is received by the eRRC 702, the eAS triggers the activation of MCCH and MTCH reception and the scheduling of MCCH and MTCH reception in 752 while the 2G CS call is active, and eMBMS reception resumes.

Figure 8:
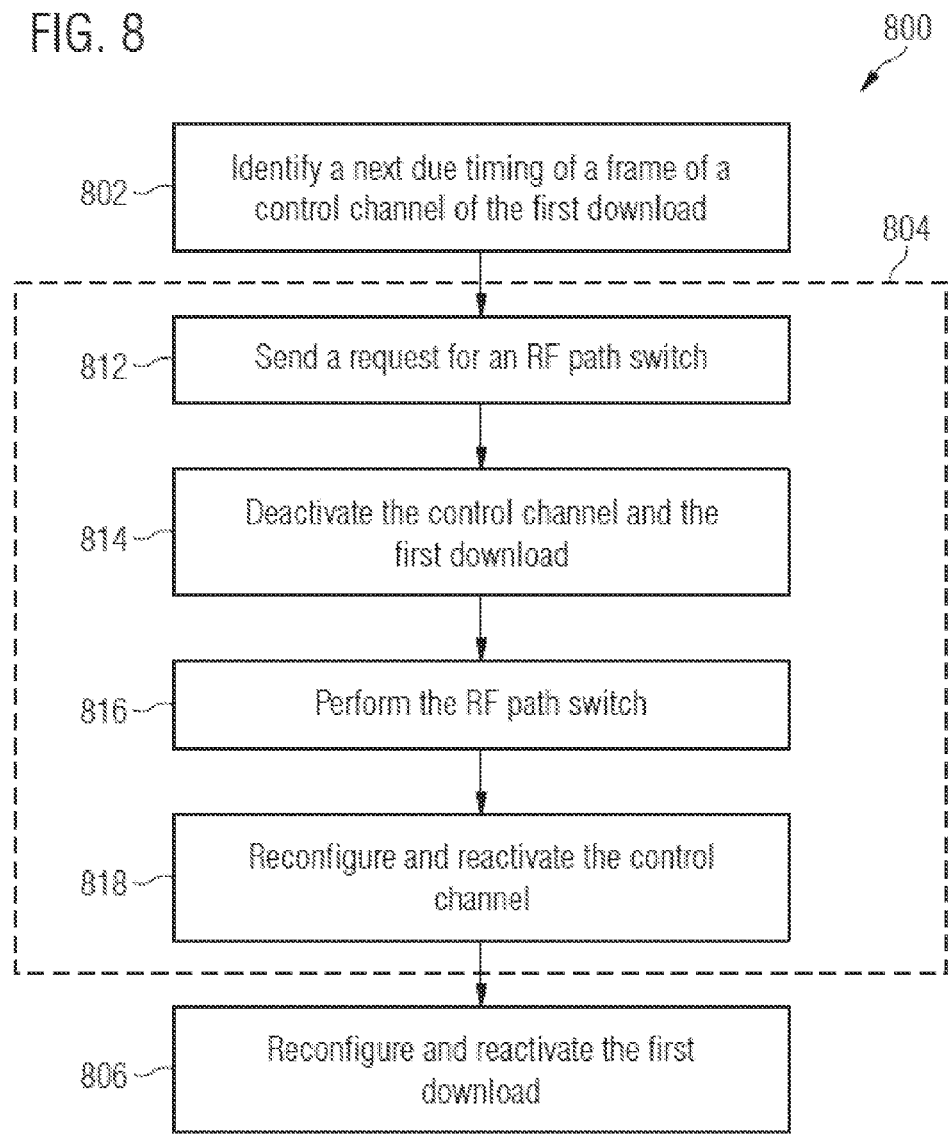
FIG. 8 shows a flow chart for an aspect of the disclosure.

FIG. 8 shows a flowchart 800 of an aspect of the disclosure to reduce the interruption in a first download (i.e. ongoing reception) by a communication device caused by the start of a second download (i.e. incoming transmission) by the communication device. First, in 802, the next due timing of a frame of a control channel of the first download is identified. Then, a sequence of events 804 is triggered, taking place at a specified time before the identified control channel frame. The sequence of events 804 consists of sending a request for an RF path switch 812, deactivating the control channel and the first download 814, performing the RF path switch 816, and reconfiguring and reactivating the control channel 818. Once the sequence of events 804 is completed, the first download is reconfigured and reactivated 806.

In Example 1, a method of reducing the interruption in a first download (i.e. ongoing reception) caused by the start of a second download (i.e. an incoming transmission) by the communication device, by identifying the next due timing of a frame of a control channel of the first download, and then triggering a sequence of sending a request for an RF path switch, deactivating the control channel and the first download, performing the RF path switch, reconfiguring and reactivating the control channel, wherein the sequence takes place at a specified time before the identified control channel frame, and reconfiguring and reactivating the first download.

In Example 2, the subject matter of Example 1 can optionally include that the first download is a multimedia broadcast/multicast service (MBMS) or evolved MBMS (eMBMS).

In Example 3, the subject matter of any one of Examples 1-2 can optionally include that the second download is a phone call.

In Example 4, the subject matter of any one of Examples 1-3 can optionally include that the control channel frame is a multicast control channel (MCCH) sub-frame or radio-frame.

In Example 5, the subject matter of any one of Examples 2-4 can optionally include that the MBMS or the eMBMS reception is carried on a multicast traffic channel (MTCH).

In Example 6, the subject matter of Example 4 can optionally include that the specified time is about 30 milliseconds or less before the next MCCH sub-frame or radio-frame. Or for example, the subject matter of Example 1 can optionally include that the specified time is about 30 milliseconds or less before the next control channel frame.

In Example 7, the subject matter of Example 4 can optionally include that the specified time is further restricted to about 20 milliseconds or less before the next MCCH sub-frame or radio-frame. Or for example, the subject matter of Example 1 can optionally include that the specified time is about 20 milliseconds or less before the next control channel frame.

In Example 8, the subject matter of either Example 6 or 7 can optionally include that the specified time is determined by at least a long term evolution (LTE) layer 1 (L1E).

In Example 9, the subject matter of Example 8 can optionally include that the ongoing MBMS or eMBMS reception continues until the specified time.

In Example 10, the subject matter of Example 2 can optionally include that the ongoing MBMS or eMBMS reception is in idle mode. Or for example, the subject matter of Example 1 can optionally include that the ongoing reception is in idle mode.

In Example 11, the subject matter of Example 2 can optionally include that the ongoing MBMS or eMBMS reception is in active mode. Or for example, the subject matter of Example 1 can optionally include that the ongoing reception is in active mode.

In Example 12, the subject matter of any one of Examples 1-11 can optionally include that the identifying of the next due timing of a control channel frame of the first download is done by at least one of the group consisting of a long term evolution (LTE) layer 1 (L1E) and an evolved Radio Resource Control (eRRC).

In Example 13, the subject matter of Example 12 can optionally include that the sequence is caused by at least one of the group consisting of the L1E and the eRRC.

In Example 14, the subject matter of any one of Examples 1-13 can optionally include that the RF path switch request is initiated by a 2G component.

In Example 15, the subject matter of Example 14 can optionally include that the RF path switch request is initiated by the layer 1 of the 2G component.

In Example 16, the subject matter of Example 15 can optionally include that the RF path switch request is received from the layer 1 of the 2G component by the layer 1 of an LTE component.

In Example 17, the subject matter of any one of Examples 1-16 can optionally include that the deactivating the control channel and the first download comprises aborting at least one of a public land mobile network search, cell selection reading, or inter-radio access technology (IRAT) gaps.

In Example 18, the subject matter of any one of Examples 1-17 can optionally include that switching the RF paths takes about 10 milliseconds or less.

In Example 19, the subject matter of any one of Examples 1-17 can optionally include that switching the RF paths takes about 1-2 milliseconds or less.

In Example 20, the subject matter of any one of Examples 1-19 can optionally include that the reconfiguring and reactivating of the control channel takes about 1-2 milliseconds.

In Example 21, the subject matter of any one of Examples 1-20 can optionally include that the reconfiguring and reactivating the control channel comprises a protocol stack reconfiguring and reactivating the long term evolution (LTE) firmware.

In Example 22, the subject matter of Example 21 can optionally include that the reconfiguration of the LTE firmware takes place before the MCCH sub-frame or radio-frame.

In Example 23, the subject matter of Example 22 can optionally include that the reconfiguration of the LTE firmware comprises the reconfiguring of MCCH and multicast traffic channel (MTCH) configurations.

In Example 24, the subject matter of Example 23 can optionally include that the reactivation of the MBMS or eMBMS reception is triggered by an evolved Access Stratum manager.

In Example 25, the subject matter of any one of Examples 1-24 can optionally include that the communication device is a multi-subscriber identity module (multi-SIM) communication device.

In Example 26, the subject matter of Example 25 can optionally include that the multi-SIM communication device comprises a Hybrid dual-reception, dual-SIM dual standby (DR-DSDS) platform.

In Example 27, the subject matter of Example 26 can optionally include that the Hybrid DR-DSDS platform comprises an optimized radio frequency (RF) engine which comprises a reception/transmission main RF path and a reception auxiliary RF path.

In Example 28, the subject matter of Example 27 can optionally include that the first download is reconfigured and reactivated on the reception auxiliary RF path.

In Example 29, the subject matter of Example 28 can optionally include that the first download is a multimedia broadcast/multicast service (MBMS) or evolved MBMS (eMBMS) reception.

In Example 30, the subject matter of Example 29 can optionally include that the second download takes place on the reception/transmission main RF path.

In Example 31, a communication device adapted for reducing an interruption in a first download (i.e. ongoing reception) caused by the start of a second download (i.e. incoming transmission), the communication device consisting of a first RF unit, a second RF unit, and a baseband modem configured to: identify the next due timing of a frame of a control channel of the first download in the first RF unit; at a specified time before the identified control channel frame, trigger the sequence of: sending a request for an RF path switch to the first RF unit and the second RF unit, deactivating the control channel and the first download in the first RF unit, controlling the RF path switch from the first RF unit to the second RF unit, and reconfiguring and reactivating the control channel on the second RF unit; and then reconfiguring and reactivating the first download in the second RF unit.

In Example 32, the subject matter of Example 31 can optionally include that the first download is a multimedia broadcast/multicast service (MBMS) or evolved MBMS (eMBMS).

In Example 33, the subject matter of any one of Examples 31-32 can optionally include that the second download is an incoming phone call.

In Example 34, the subject matter of any one of Examples 31-33 can optionally include that the control channel frame is a multicast control channel (MCCH) sub-frame or radio-frame.

In Example 35, the subject matter of any one of Examples 32-34 can optionally include that the MBMS or the eMBMS reception is carried on a multicast traffic channel (MTCH).

In Example 36, the subject matter of Example 34 can optionally include that the specified time is about 30 milliseconds or less before the next MCCH sub-frame or radio-frame. Or for example, the subject matter of Example 31 can optionally include that the specified time is about 30 milliseconds or less before the next control channel frame.

In Example 37, the subject matter of Example 34 can optionally include that the specified time is further restricted to about 20 milliseconds or less before the next MCCH sub-frame or radio-frame. Or for example, the subject matter of Example 31 can optionally include that the specified time is about 20 milliseconds or less before the next control channel frame.

In Example 38, the subject matter of either Example 36 or 37 can optionally include that the specified time is determined by at least a long term evolution (LTE) layer 1 (L1E).

In Example 39, the subject matter of Example 38 can optionally include that the ongoing MBMS or eMBMS reception continues until the specified time.

In Example 40, the subject matter of Example 32 can optionally include that the ongoing MBMS or eMBMS reception is in idle mode. Or for example, the subject matter of Example 31 can optionally include that the ongoing reception is in idle mode.

In Example 41, the subject matter of Example 32 can optionally include that the ongoing MBMS or eMBMS reception is in active mode. Or for example, the subject matter of Example 31 can optionally include that the ongoing reception is in active mode.

In Example 42, the subject matter of any one of Examples 31-41 can optionally include that the identifying of the next due timing of a control channel frame of the first download is done by at least one of the group consisting of a long term evolution (LTE) layer 1 (L1E) and an evolved Radio Resource Control (eRRC).

In Example 43, the subject matter of Example 42 can optionally include that the sequence is caused by at least one of the group consisting of the L1E and the eRRC.

In Example 44, the subject matter of any one of Examples 31-43 can optionally include that the RF path switch request is initiated by a 2G component.

In Example 45, the subject matter of Example 44 can optionally include that the RF path switch request is initiated by the layer 1 of the 2G component.

In Example 46, the subject matter of Example 45 can optionally include that the RF path switch request is received from the layer 1 of the 2G component by the layer 1 of an LTE component.

In Example 47, the subject matter of any one of Examples 31-46 can optionally include that the deactivating the control channel and the first download comprises aborting at least one of a public land mobile network search, cell selection reading, or inter-radio access technology (IRAT) gaps.

In Example 48, the subject matter of any one of Examples 31-47 can optionally include that the switching of the RF paths takes about 10 milliseconds or less.

In Example 49, the subject matter of any one of Examples 31-47 can optionally include that the switching of the RF paths takes about 1-2 milliseconds or less.

In Example 50, the subject matter of any one of Examples 31-49 can optionally include that the reconfiguring and reactivating of the control channel takes about 1-2 milliseconds.

In Example 51, the subject matter of any one of Examples 31-50 can optionally include that the reconfiguring and reactivating the control channel comprises a protocol stack reconfiguring and reactivating the long term evolution (LTE) firmware.

In Example 52, the subject matter of Example 51 can optionally include that the reconfiguration of the LTE firmware takes place before the MCCH sub-frame or radio-frame.

In Example 53, the subject matter of Example 52 can optionally include that the reconfiguration of the LTE firmware comprises the reconfiguring of MCCH and multicast traffic channel (MTCH) configurations.

In Example 54, the subject matter of Example 53 can optionally include that the reactivation of the MBMS or eMBMS reception is triggered by an evolved Access Stratum manager.

In Example 55, the subject matter of any one of Examples 31-54 can optionally include that the communication device is a multi-subscriber identity module (multi-SIM) communication device.

In Example 56, the subject matter of Example 55 can optionally include that the multi-SIM communication device comprises a Hybrid dual-reception, dual-SIM dual standby (DR-DSDS) platform.

In Example 57, the subject matter of Example 56 can optionally include that the Hybrid DR-DSDS platform comprises an optimized radio frequency (RF) engine in which the first unit is a reception/transmission main RF path and the second unit is a reception auxiliary RF path.

In Example 58, the subject matter of Example 57 can optionally include that the first download is reconfigured and reactivated on the reception auxiliary RF path.

In Example 59, the subject matter of Example 58 can optionally include that the first download is a multimedia broadcast/multicast service (MBMS) or evolved MBMS (eMBMS) reception.

In Example 60, the subject matter of Example 59 can optionally include that the second download takes place on the reception/transmission main RF path.

In Example 61, a non-transitory computer readable medium containing program instructions for a communication device to reduce the interruption of a first download (i.e. ongoing reception) caused by the start of a second download (i.e. an incoming transmission) by identifying the next due timing of a control channel frame, and then triggering a sequence of sending a request a frequency path switch, of deactivating the control channel and the first download, performing the frequency path switch, reconfiguring and reactivating the control channel, wherein the sequence takes place at a specified time before the identified control channel frame, and reconfiguring and reactivating the first download.

In Example 62, the subject matter of Example 61 can optionally include that the first download is a multimedia broadcast/multicast service (MBMS) or evolved MBMS (eMBMS).

In Example 63, the subject matter of any one of Examples 61-62 can optionally include that the second download is an incoming phone call.

In Example 64, the subject matter of any one of Examples 61-63 can optionally include that the control channel frame is a multicast control channel (MCCH) sub-frame or radio-frame.

In Example 65, the subject matter of any one of Examples 62-64 can optionally include that the MBMS or the eMBMS reception is carried on a multicast traffic channel (MTCH).

In Example 66, the subject matter of Example 64 can optionally include that the specified time is about 30 milliseconds or less before the next MCCH sub-frame or radio-frame. Or for example, the subject matter of Example 61 can optionally include that the specified time is about 30 milliseconds or less before the next control channel frame.

In Example 67, the subject matter of Example 64 can optionally include that the specified time is further restricted to about 20 milliseconds or less before the next MCCH sub-frame or radio-frame. Or for example, the subject matter of Example 61 can optionally include that the specified time is about 20 milliseconds or less before the next control channel frame.

In Example 68, the subject matter of either Example 66 or 67 can optionally include that the specified time is determined by at least a long term evolution (LTE) layer 1 (L1E).

In Example 69, the subject matter of Example 68 can optionally include that the ongoing MBMS or eMBMS reception continues until the specified time.

In Example 70, the subject matter of Example 62 can optionally include that the ongoing MBMS or eMBMS reception is in idle mode.

In Example 71, the subject matter of Example 62 can optionally include that the ongoing MBMS or eMBMS reception is in active mode.

In Example 72, the subject matter of any one of Examples 61-71 can optionally include that the identifying of the next due timing of a control channel frame of the first download is done by at least one of the group consisting of a long term evolution (LTE) layer 1 (L1E) and an evolved Radio Resource Control (eRRC).

In Example 73, the subject matter of Example 72 can optionally include that the sequence is caused by at least one of the group consisting of the LIE and the eRRC.

In Example 74, the subject matter of any one of Examples 61-73 can optionally include that the RF path switch request is initiated by a 2G component.

In Example 75, the subject matter of Example 74 can optionally include that the RF path switch request is initiated by the layer 1 of the 2G component.

In Example 76, the subject matter of Example 75 can optionally include that the RF path switch request is received from the layer 1 of the 2G component by the layer 1 of an LTE component.

In Example 77, the subject matter of any one of Examples 61-76 can optionally include that the deactivating the control channel and the first download comprises aborting at least one of a public land mobile network search, cell selection reading, or inter-radio access technology (IRAT) gaps.

In Example 78, the subject matter of any one of Examples 61-77 can optionally include that switching the RF paths takes about 10 milliseconds or less.

In Example 79, the subject matter of any one of Examples 61-77 can optionally include that switching the RF paths takes about 1-2 milliseconds or less.

In Example 80, the subject matter of any one of Examples 61-79 can optionally include that the reconfiguring and reactivating of the control channel takes about 1-2 milliseconds.

In Example 81, the subject matter of any one of Examples 61-80 can optionally include that the reconfiguring and reactivating the control channel comprises a protocol stack reconfiguring and reactivating the long term evolution (LTE) firmware.

In Example 82, the subject matter of Example 81 can optionally include that the reconfiguration of the LTE firmware takes place before the MCCH sub-frame or radio-frame.

In Example 83, the subject matter of Example 82 can optionally include that the reconfiguration of the LTE firmware comprises the reconfiguring of MCCH and multicast traffic channel (MTCH) configurations.

In Example 84, the subject matter of Example 83 can optionally include that the reactivation of the MBMS or eMBMS reception is triggered by an evolved Access Stratum manager.

In Example 85, the subject matter of any one of Examples 61-84 can optionally include that the communication device is a multi-subscriber identity module (multi-SIM) communication device.

In Example 86, the subject matter of Example 85 can optionally include that the multi-SIM communication device comprises a Hybrid dual-reception, dual-SIM dual standby (DR-DSDS) platform.

In Example 87, the subject matter of Example 86 can optionally include that the Hybrid DR-DSDS platform comprises an optimized radio frequency (RF) engine which comprises a reception/transmission main RF path and a reception auxiliary RF path.

In Example 88, the subject matter of Example 87 can optionally include that the first download is reconfigured and reactivated on the reception auxiliary RF path.

In Example 89, the subject matter of Example 88 can optionally include that the first download is a multimedia broadcast/multicast service (MBMS) or evolved MBMS (eMBMS) reception.

In Example 90, the subject matter of Example 89 can optionally include that the second download takes place on the reception/transmission main RF path.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. A communication device adapted for reducing an interruption in a first download caused by a start of a second download, the communication device comprising:
    a first radio frequency (RF) unit and a second RF unit; and
    a baseband modem unit configured to:
        identify a next due timing of a frame of a control channel of the first download in the first RF unit;
        at a specified time before the identified control channel frame, trigger a sequence of:
            sending a request for an RF path switch to the first RF unit and the second RF unit;
            deactivating the control channel and the first download in the first RF unit;
            controlling the RF path switch from the first RF unit to the second RF unit; and
            reconfiguring and reactivating the control channel on the second RF unit; and
        reconfigure and reactivate the first download in the second RF unit.

2. The communication device of claim 1, wherein the first download is a multimedia broadcast/multicast service (MBMS) or evolved MBMS (eMBMS).

3. The communication device of claim 1, wherein the second download is an incoming phone call.

4. The communication device of claim 2, wherein the identified control channel frame is a multicast control channel (MCCH) sub-frame or radio-frame.

5. The communication device of claim 4, wherein the specified time is about 30 milliseconds or less before the next MCCH sub-frame or radio-frame.

6. The communication device of claim 2, wherein the ongoing MBMS or eMBMS reception is in idle mode.

7. The communication device of claim 2, wherein the ongoing MBMS or eMBMS reception is in active mode.

8. The communication device of claim 1, wherein the communication device is a multi-subscriber identity module (multi-SIM) communication device.

9. The communication device of claim 8, wherein the multi-SIM communication device comprises a Hybrid dual-reception, dual-SIM dual standby (DR-DSDS) platform.

10. The communication device of claim 9, wherein the Hybrid DR-DSDS platform comprises an optimized radio frequency (RF) engine in which the first RF unit is a reception/transmission main RF path and the second RF unit is a reception auxiliary RF path.

11. The communication device of claim 10, wherein the first download is reconfigured and reactivated on the reception auxiliary RF path.

12. The communication device of claim 11, wherein the second download takes place on the reception/transmission main RF path.

13. A method of reducing an interruption of a first download by a communication device caused by a start of a second download by the communication device, comprising:
  identifying a next due timing of a frame of a control channel of the first download;
  triggering a sequence of:
    sending a request for a radio frequency (RF) path switch;
    deactivating the control channel and the first download;
    performing the RF path switch; and
    reconfiguring and reactivating the control channel;
    wherein the sequence takes place at a specified time before the identified control channel frame; and
  reconfiguring and reactivating the first download.

14. The method of claim 13, wherein the first download is a multimedia broadcast/multicast service (MBMS) or an evolved MBMS (eMBMS).

15. The method of claim 13, wherein the second download is an incoming phone call.

16. The method of claim 14, wherein the identified control channel frame is a multicast control channel (MCCH) sub-frame or radio-frame.

17. The method of claim 16, wherein the specified time is about 30 milliseconds or less before the next MCCH sub-frame or radio-frame.

18. A non-transitory computer readable medium containing program instructions, which when executed by a processor of a communication device, cause the communication device to reduce an interruption of a first download caused by a start of a second download by the communication device, comprising:
  identifying a next due timing of a frame of a control channel of the first download;
  triggering a sequence of:
    sending a request for a radio frequency (RF) path switch;
    deactivating the control channel and the first download;
    performing the RF path switch;
    reconfiguring and reactivating the control channel;
    wherein the sequence takes place at a specified time before the identified control channel frame; and
  reconfiguring and reactivating the first download.

19. The non-transitory computer readable medium of claim 18, wherein the first download is a multimedia broadcast/multicast service (MBMS) or evolved MBMS (eMBMS).

20. The non-transitory computer readable medium of claim 19, wherein the specified time is about 30 milliseconds or less before a next multicast control channel sub-frame or radio-frame.

* * * * *